United States Patent [19]

Weber et al.

[11] Patent Number: 4,766,172

[45] Date of Patent: Aug. 23, 1988

[54] MOLD RELEASE COMPOSITION, MIXTURES CONTAINING THIS MOLD RELEASE COMPOSITION, A PROCESS FOR THE PRODUCTION OF MOLDED ARTICLES AND THE MOLDED ARTICLES OBTAINED BY THIS PROCESS

[75] Inventors: Christian Weber, Leverkusen; Peter Haas, Haan, both of Fed. Rep. of Germany

[73] Assignee: Bayer Aktiengesellschaft, Leverkusen, Fed. Rep. of Germany

[21] Appl. No.: 76,431

[22] Filed: Jul. 21, 1987

[30] Foreign Application Priority Data

Aug. 7, 1986 [DE] Fed. Rep. of Germany ....... 3626673

[51] Int. Cl.$^4$ ............................................. C08G 18/30
[52] U.S. Cl. .................. 524/783; 264/328.1; 264/328.6; 264/328.8; 528/55; 528/60; 528/62; 528/64; 528/66; 528/73; 528/78; 106/38.22; 106/38.24
[58] Field of Search ...................... 252/182; 264/328.1, 264/328.6, 328.8; 524/783; 528/55, 60, 62, 64, 66, 73, 78

[56] References Cited

U.S. PATENT DOCUMENTS

| | | | |
|---|---|---|---|
| 3,726,952 | 4/1973 | Boden et al. | 264/48 |
| 4,218,543 | 8/1980 | Weber et al. | 521/51 |
| 4,519,965 | 5/1985 | Taylor et al. | 264/51 |
| 4,581,386 | 4/1986 | Taylor et al. | 521/125 |
| 4,585,803 | 4/1986 | Nelson et al. | 521/105 |

FOREIGN PATENT DOCUMENTS

0081701 6/1983 European Pat. Off. .
0119471 9/1984 European Pat. Off. .

*Primary Examiner*—John Kight
*Assistant Examiner*—S. A. Acquah
*Attorney, Agent, or Firm*—Gene Harsh; Joseph C. Gil; Thomas W. Roy

[57] ABSTRACT

The present invention is directed to mold release compositions based on a solution which is liquid at room temperature and contains (i) at least one zinc salt of a straight or branched chain, saturated or unsaturated aliphatic carboxylic acid containing 8 to 24 carbon atoms in (ii) at least one organic compound containing tertiary nitrogen atoms which is liquid at room temperature, the zinc salt being present in a quantity of about 10 to 75% by weight, based on the total weight of the composition, characterized in that component (ii) is based on at least one compound corresponding to the formula

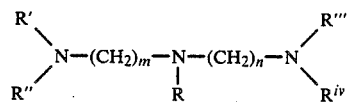

wherein R′, R″, R‴ and R$^{iv}$, which may be identical or different, denote alkyl group containing 1 to 4 carbon atoms or any two of the groups R′ and R″ or R‴ and R$^{iv}$ may combine with the nitrogen atom to form a 6-membered heterocyclic ring optionally containing an oxygen atom or an alkyl substituted nitrogen atom as hetero atom and having a total of 4 or 5 carbon atoms, R denotes hydrogen or a group of the formula

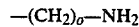

and m, n and o denote identical or different integers with values from 2 to 6.

The present invention is also directed to a mixture suitable for use as a reactant for polyisocyanates containing isocyanate-reactive groups and the mold release composition described above. Finally, the present invention is directed to a process for the production of a elastomeric molded article having a nonporous surface by reacting a polyisocyanate with the previously described mixture containing isocyanate-reactive groups and to the molded articles produced by the process.

12 Claims, No Drawings

MOLD RELEASE COMPOSITION, MIXTURES CONTAINING THIS MOLD RELEASE COMPOSITION, A PROCESS FOR THE PRODUCTION OF MOLDED ARTICLES AND THE MOLDED ARTICLES OBTAINED BY THIS PROCESS

BACKGROUND OF THE INVENTION

1. Field of the Invention

The present invention relates to a new mold release composition for the production of molded articles based on polyurethanes or polyureas with selfreleasing properties, a mixture of compounds carrying isocyanate reactive groups containing this composition, a process for the production of elastic molded bodies with a compact surface layer using these mixtures, and the molded bodies obtained by this process.

2. Description of the Prior Art

The production of elastomeric molded articles based on polyurethanes or polyureas by the reaction inside closed molds of reaction mixtures composed of a polyisocyanate component, relatively high molecular weight compounds containing isocyanate reactive groups, low molecular weight chain lengthening agents and the usual auxiliary agents and additives has already been disclosed, for example in DE-AS No. 2,622,951 or in EP-B-No. 0,081,701. In these prior art processes, the reaction mixtures are generally prepared by the reaction injection molding technique and introduced into a mold as soon as they have been prepared. The resulting molded articles are then generally removed after a very brief dwell time in the mold. For satisfactory performance of this process it is essential that the molded articles should be easily released from the mold, especially if they are produced on a large scale. Not only the use of so-called "external mold release agents", i.e. mold release compositions with which the mold is coated before it is filled, but also the use of so-called "internal mold release agents" is very important for this purpose. "Internal mold release agents" are substances which are incorporated in the reaction mixture so that the molded product obtained adheres less firmly to the surface of the mold than it would if it did not contain such mold release agents. For the production of elastomeric molded products, in particular those having a density of about 0.8 to 1.4 g/cm³, it has been found very suitable to use combinations of zinc salts of long chained carboxylic acids, in particular zinc stearate, and certain organic compounds containing tertiary amine nitrogen atoms. One example of a typical compound of this kind containing tertiary amine nitrogen atoms is the addition product of about 5 mol of propylene oxide to 1 mol of ethylene diamine. These compounds containing tertiary amine nitrogen atoms act as solvents for the zinc salt which is generally difficult to dissolve and at the same time they impart a certain solubility to zinc stearate in mixtures of isocyanate reactive compounds which serve as the reaction partners for the polyisocyanates. Such mold release compositions and their use for the production of elastomeric molded articles have already been described, for example in U.S. Pat. Nos. 4,519,965, 4,581,386 and 4,585,803.

One disadvantage of these prior art mold release compositions, however, is that they have only a limited solubilizing effect so that when such prior art mold release compositions are added to mixtures of compounds containing isocyanate reactive groups of the kind used in the aforesaid process, the mixtures must be rapidly processed after addition of the mold release composition because the mold release effect diminishes if the mixtures are left to stand. In practice, therefore, the mold release compositions are generally added to the compounds containing isocyanate reactive groups only shortly before production of the molded articles. This incidentally also applies to mold release compositions consisting of zinc salts, in particular zinc stearate, and compounds containing primary amino groups of the kind recommended, for example in EP-A-No. 0,119,471.

It is an object of the present invention to provide new mold release compositions which do not have the above-described disadvantage of losing their mold release effect when stored in the form of mixtures ready for use.

This problem was able to be solved by means of the mold release compositions according to the invention described below. These mold release compositions contain certain selected tertiary amines of the kind described below as solvents or compatibility transmitting agents for the zinc salt, in particular zinc stearate. The mold release compositions according to the invention are distinguished in particular by a combination of the following advantages:

1. The mold release effect obtainable with the new mold release compositions is at least equal to the mold release effect obtainable with the mold release compositions known in the art.

2. Mixtures of compounds containing isocyanate reactive groups of the kind used for the production of elastomeric molded articles and containing mold release compositions according to the invention need not be processed immediately after they have been prepared (by adding the mold release composition to the other components) since molded products with excellent self-releasing properties can be obtained from the completely prepared mixtures regardless of whether or not the mixtures have been kept in storage before being molded. In practice, this means that the manufacturer of molded articles need no longer prepare the complete mixture freshly at frequent intervals by mixing the mold release composition with other compounds.

SUMMARY OF THE INVENTION

The present invention is directed to mold release compositions based on a solution which is liquid at room temperature and contains (i) at least one zinc salt of a straight or branched chain, saturated or unsaturated aliphatic carboxylic acid containing 8 to 24 carbon atoms in (ii) at least one organic compound containing tertiary nitrogen atoms which is liquid at room temperature, the zinc salt being present in a quantity of about 10 to 75% by weight, based on the total weight of the composition, characterized in that component (ii) is based on at least one compound corresponding to the formula

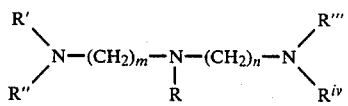

wherein

R', R'', R''' and R$^{iv}$, which may be identical or different, denote alkyl groups containing 1 to 4 carbon atoms or any two of the groups R' and R'' or R''' and R$^{iv}$ may combine with the nitrogen atom to form a 6-membered heterocyclic ring optionally containing an oxygen atom or an alkyl substituted nitrogen atom as hetero atom and having a total of 4 or 5 carbon atoms, R denotes hydrogen or a group of the formula —(CH$_2$)$_o$—NH$_2$ and m, n and o denote identical or different integers with values from 2 to 6.

The present invention is also directed to a mixture suitable for use as a reactant for polyisocyanates and containing (a) at least one organic compound having a molecular weight of 400 to about 12,000 and containing at least two isocyanate reactive groups, (b) about 5 to 50% by weight, based on the weight of component a), of at least one organic compound in the molecular weight range of 62 to 399 which contains isocyanate reactive hydrogen atoms and is difunctional in isocyanate addition reactions and (c) at least one mold release agent composition according to the invention of the type mentioned above.

The present invention is further directed to a process for the production of elastomeric molded articles of polyurethane or polyurea elastomers having a nonporous surface by reacting inside closed molds (A) a polyisocyanate component based on at least one di- or polyisocyanate exclusively containing aromatically bound isocyanate groups and (B) a mixture of the type mentioned above of a reaction component containing internal mold release agents and compounds having isocyanate reactive groups.

Lastly, the present invention is directed to the molded articles obtained by this process.

DETAILED DESCRIPTION OF THE INVENTION

In the context of the present invention, the term "polyurethane" includes polyurethanes containing urea groups, but the term "polyurea" is used only for polyureas which are free from urethane groups.

Component (i) of the mold release composition according to the invention is based on at least one zinc salt of an organic, optionally branched and/or optionally olefinically unsaturated carboxylic acid having 8 to 24 carbon atoms. Suitable zinc salts include zinc octoate, stearate, oleate, palmitate and laurate and any mixtures of such zinc salts. Component (i) of the mold release composition according to the invention is most preferably zinc stearate.

Component (ii) of the mold release composition according to the invention is based on compounds with tertiary amino groups as represented by the general formula shown above. In the above-mentioned general formula, R', R'', R''' and R$^{iv}$ are all preferably methyl groups, m and n are preferably identical and preferably have the value 2 or 3, and R preferably stands for hydrogen or a group of the formula —(CH$_2$)$_o$—NH$_2$ where o has the value 2 or 3.

Compounds corresponding to formulae I and VIII are typical examples of suitable or particularly suitable tertiary amino compounds:

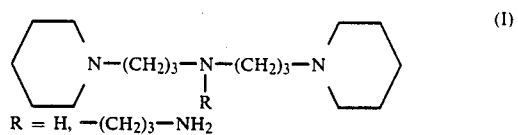
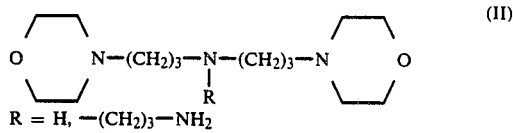
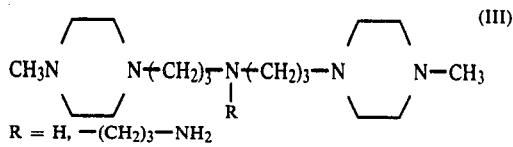
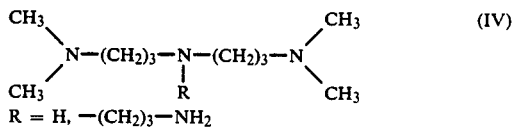
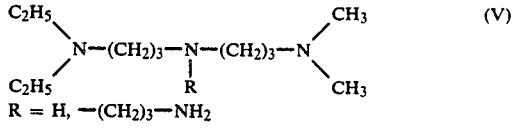
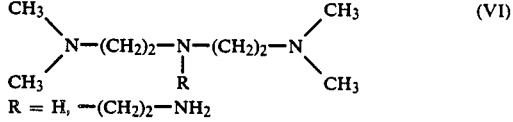
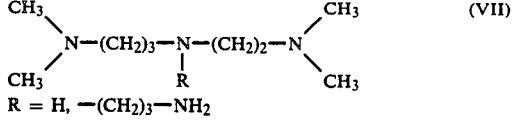
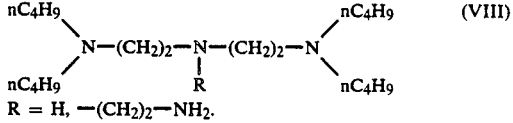

Any mixtures of such tertiary amino compounds may be used. Compounds of formulae IV and VI in which R=H are particularly preferred.

In the mold release compositions according to this invention, the individual components (i) and (ii) are preferably contained in such quantities that the proportion by weight of the zinc salt, based on the total weight of the composition is in the range of about 10 to 75% by weight, preferably about 40 to 60% by weight.

Preparation of the mold release compositions is carried out by simply mixing the individual components at room temperature or moderately elevated temperature. Clear solutions of the zinc salt in the compounds containing tertiary amino groups are obtained.

The above-mentioned individual components (a), (b), (c) and optionally additional auxiliary agents and additives (d) are present in the mixtures of compounds containing isocyanate reactive groups according to the invention.

Component (a) is generally a polyether containing 2 to 3 isocyanate reactive groups and having a molecular weight of 400 to about 12,000, preferably about 1800 to 12,000 and most preferably about 2000 to 6000. Corresponding polyether mixtures containing a statistical average of 2 to 3 isocyanate reactive groups may also be used. The isocyanate reactive groups are groups selected from primary hydroxyl groups, secondary hydroxyl groups and primary amino groups which may be attached either to aliphatic or to aromatic carbon atoms. Any mixtures of such compounds containing isocyanate reactive groups may be used; furthermore, polyethers in which the isocyanate reactive groups consist partly of hydroxyl groups and partly of the amino groups of the type mentioned-above may also be used. Component (a) or individual constituents of component (a) preferably are based on polyether polyols in which the hydroxyl groups are predominantly (to an extent of more than about 50%, in particular more than about 80%, based on all of the hydroxyl groups) of primary hydroxyl groups, or polyethers in which the isocyanate reactive groups are aromatically bound primary amino groups.

Component (a) may thus contain polyether polyols of the type described in DE-AS No. 2,622,951 (U.S. Pat. No. 4,218,543, herein incorporated by reference in its entirety), polyether polyols of the type mentioned in EP-B No. 0,017,928 (U.S. Pat. No. 4,298,701, herein incorporated by reference in its entirety), polyether polyols of the type mentioned in EP-B-No. 0,044,481 (U.S. Pat. No. 4,379,105, herein incorporated by reference in its entirety) and any mixtures of such polyether polyols as well as polyethers containing amino groups and optionally hydroxyl groups such as those mentioned in EP-B-No. 0,081,701. The last mentioned polyethers containing amino groups are preferably the kind obtained by the hydrolysis of compounds containing isocyanate end groups, for example as described in DE-OS No. 2,948,419 or in U.S. Pat. Nos. 4,515,923, 4,525,590 and 4,540,720, all of which are herein incorporated by reference in their entirety.

Component (b) contains chain lengthening agents in the molecular weight range of 62 to 399, i.e. in particular compounds which are difunctional in isocyanate addition reactions and contain primary alcoholic hydroxyl groups or aromatically bound primary amino groups. It is possible in principle to include a minor quantity of higher than difunctional compounds in component (b) in cases where it is desired to ensure branching of the resulting polyurethanes or polyureas.

The following are examples of suitable chain lengthening agents (b):

b1) polyhydroxyl compounds in the above-mentioned molecular weight range such as ethylene glycol, propylene glycol, diethylene glycol, dipropylene glycol, 1,3-dihydroxypropane, 1,4-dihydroxybutane, 1,6-dihydroxyhexane, trimethylolpropane or glycerol;

(b2) diamines containing aromatically bound primary amino groups such as 1,4-diaminobenzene, 2,4-diaminotoluene, 2,4'- and/or 4,4'-diaminodiphenylmethane; preferably aromatic diamines having an alkyl substituent in at least one ortho-position to each amino group; more preferably diamines which have at least one alkyl substituent in the orthoposition to the first amino group and two alkyl substituents, each with 1 to 4 carbon atoms, in the ortho-positions to the second amino group; most preferred are those carrying an ethyl, n-propyl and/or isopropyl substituent in at least one ortho-position to each amino group and optionally methyl substituents in other ortho-positions to the amino groups. The following are examples of such preferred or particularly preferred diamines: 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraisopropyl4,4'-diaminodiphenylmethane and any mixtures of such diamines. 1-methyl-3,5-diethyl2,4-diaminobenzene and commercial mixtures containing up to about 35% by weight of the 1-methyl-3,5-diethyl-2,6-diaminobenzene isomer, based on the whole mixture, are particularly preferred.

Component (b) could in principle also be based on a mixture of diamines of the kind exemplified and polyhydroxy compounds of the kind exemplified.

The mixtures according to the invention generally contain component (b) in a quantity of about 5 to 50% by weight, preferably about 12 to 26% by weight, based on the weight of component (a).

Component (c) of the mixtures according to the invention is based on the above-described mold release compositions according to the invention. These mold release compositions are present in mixtures according to the invention in such quantities that the mixtures contain about 0.5 to 10 parts by weight, preferably about 1 to 4 parts by weight of zinc stearate, based on 100 parts by weight of component (a).

The auxiliary agents additives (d) optionally present in the mixtures according to the invention are known and described, for example, in EP-B-No. 0,081,701, col. 6, line 40 to col. 9, line 31. The following should be particularly mentioned.

(d1) Prior art mold release agents as described, for example, in DE-OS No. 1,953,637, DE-OS No. 2,121,670, DE-OS No. 2,431,968, DE-OS No. 2,404,310, DE-OS No. 2,319,648, DE-OS No. 2,356,692, DE-OS No. 2,363,452, DE-OS No. 2,427,273 or DE-OS No. 2,431,968 and optionally used in addition to the mold release component (c) which are essential to this invention.

In addition, it is also possible to use the mold release agents set forth in U.S. Pat. Nos. 4,519,965 and 4,581,386, the disclosures of which are herein incorporated by reference in their entirety. These references disclose compatibilizers for the zinc salts which include nitrogen-containing, isocyanate reactive, acyclic compounds such as aliphatic polyamines and preferably nitrogen-containing, isocyanate reactive polymers such as polyethers. The preferred compatibilizers include polyether polyamines and amine- or hydroxyl-terminated, amine-initiated polyethers More preferred are the hydroxyl-terminated, amine-initiated polyethers, especially ethylene diamine initiated polyethers such as the polyether tetrol used in comparison example 2 hereinafter. With regard to the mold release compositions containing zinc salts (i) and liquid, tertiary amine-containing organic compounds (ii), these prior art compatibilizers may be used in an amount sufficient to replace up to about 80% by weight, preferably about 30 to 70% by weight, of the tertiary amine-containing organic compounds which may be present in the mold release compositions.

(2²) Catalysts for the isocyanate polyaddition reaction, in particular tertiary amines or organic tin compounds of the type exemplified in EP-B No. 0,081,701 which are used in quantities of about 0.01 to 10% by weight, preferably about 0.05 to 2% by weight, based on the weight of component (a), especially when component (a) predominantly or exclusively contains polyether polyols of the type exemplified above. If components (a) and (b) consist exclusively of compounds containing amino groups then catalysts are generally not necessary although they may still be used.

Components (a) to (d) may be mixed in any sequence for the preparation of the mixtures according to the invention. Thus, for example, a "premix" may be prepared from component (c) and at least part of component (b), for example an aromatic diamine of the type mentioned above, and this premix may subsequently, i.e. at some later stage, be mixed with the other components.

To carry out the process according to the invention, the mixtures according to the invention of compounds containing isocyanate reactive groups and mold release compositions according to the invention are reacted with organic polyisocyanates (A). Polyisocyanates containing exclusively of aromatically bound isocyanate groups as described, for example, in EP-B No. 0,081,701, col. 3, line 30 to col. 4, line 25 are suitable for use as polyisocyanates (A).

It is particularly preferred to base component (A) on polyisocyanates or polyisocyanate mixtures of the diphenylmethane series which are liquid at room temperature and optionally contain urethane groups, carbodiimide groups and/or uretoneimine groups. By "polyisocyanates and polyisocyanate mixtures of the diphenylmethane series" are meant both polyisocyanate mixtures obtained by the known method of phosgenating aniline/formaldehyde condensates and diisocyanate fractions separated from these mixtures by distillation. To be included among the particularly preferred polyisocyanates (A) are derivatives of 4,4'-diisocyanatodiphenylmethane which are liquid at room temperature such as polyisocyanates containing urethane groups obtained according to DE-PS No. 1,618,380 by the reaction of 1 mol of 4,4'-diisocyanatodiphenylmethane with about 0.05 to 0.3 mol of low molecular weight diols or triols, preferably with polypropylene glycols having a molecular weight below 700; or diisocyanates based on 4,4'-diisocyanatodiphenylmethane and containing carbodiimide and/or uretoneimine groups as obtained, for example, according to U.S. Pat. Nos. 3,152,162, 3,384,653 or 3,429,256, DE-OS No. 2,537,685 or EP-A-No. 5,233. Also to be included among the preferred polyisocyanates are the corresponding modification products based on mixtures of 2,4'- and 4,4'-diisocyanatodiphenylmethane or mixtures of the above-described modified 4,4'-diisocyanatodiphenylmethane with minor quantities of higher than difunctional polyisocyanates of the diphenylmethane series, for example those of the type described in DE-OS No. 2,624,526.

Polyisocyanate component (A) used in the process according to the invention is reacted with component (B), i.e. with the mixture of isocyanate reactive compounds containing the mold release composition according to the invention. The quantity of polyisocyanate component (A) added is calculated to provide about 0.7 to 1.3, preferably about 1.0 to 1.2 isocyanate groups from component (A) for each isocyanate reactive group of component (B) (corresponding to an isocyanate index of about 70 to 130, preferably about 100 to 120). The primary or secondary amino groups present in component (c) are included in the calculation but not carboxyl groups optionally present in additional mold release agents.

The process according to the invention is preferably carried out by the known reaction injection molding (RIM) technique in which the individual components (A) and (B) are mixed together and then immediately introduced into the mold. The quantity of mixture introduced into the mold, which may be a foamable mixture, is generally calculated to produce molded articles having a density of about 0.25 to 1.4 g/cm$^3$, preferably about 0.8 to 1.4 and most preferably about 0.9 to 1.2 g/cm$^3$. The molded articles obtained may have a density above about 1.2 g/cm$^3$, especially if they contain mineral fillers. From the density figures given, it is apparent that the molded articles according to the invention ar preferably either solid or microcellular plastics. The molded articles may generally be removed from the mold after a dwell time of about 5 to 90 seconds, preferably about 20 to 60 seconds, as taught by DE-AS No. 2,622,951 or EP-B-No. 0,081,701.

The starting temperature chosen for the mixture introduced into the mold is generally about 10° to 60° C., preferably about 20° to 50° C. The temperature of the mold is generally about 40° to 140° C., preferably about 50° to 70° C.

The process according to the invention is suitable in particular for the production of high quality elastomeric molded products which are suitable in particular for the manufacture of flexible motor vehicle bumpers and other car body parts.

Compared with corresponding prior art molded products, the molded products according to the invention are generally distinguished by their easier release from the mold. This improved removal from the mold is also found in those cases in which component (B) has not been prepared immediately beforehand by mixing the mold release composition according to the invention with the other components. The excellent self-releasing properties of the molded articles according to the invention are to a large extent independent of the "age" of component (B).

The invention is further illustrated, but is not intended to be limited by the following examples in which all parts and percentages are by weight unless otherwise specified.

EXAMPLES

Components (A) and (B) used in the following examples are processed by the reaction injection molding (RIM) technique.

The polyisocyanate components and polyol mixtures were introduced into a high pressure apparatus and, after being vigorously mixed in a force controlled mixing head, were rapidly forced into a metal mold.

The mold of tool steel in the form of a bowl produced molded parts having the following dimensions:

| | |
|---|---|
| External diameter of bottom | 178 mm |
| External diameter of rim | 186 mm |
| Wall thickness | 4 mm |
| Height of molded part | 68 mm |
| Conicity* | 3.50° |

Sprue: Swelling sprue, centrally at the bottom ($\phi$ = 10 mm).
*The "conicity" indicates the angle of the deviation of the vertical walls from a strictly vertical direction. A conicity of 3,5° means that the inner angle between bottom and vertical wall of the bowl is 93,5°.

For removing the molded bowl it is necessary to overcome powerful shearing forces on the wall surfaces. The tearing forces were measured by means of a force transducer with elongation measuring strips as measuring element (Hottinger Baldwin Messtechnik GmbH, D-6100 Darmstadt 1).

The temperature of the raw materials was 45° C. and the temperature of the mold was 65° C. The dwell time in the mold was adjusted to 20 seconds and the cycle to 60 seconds.

The surface of the mold was treated with a commercial mold release agent (RTCW 2006, manufacturer Chem-Trend International, 3205 E, Grand River, Howell, Mich. 48843/US) before the first molded part was produced.

EXAMPLE 1

1.80 parts by weight of zinc stearate (Haro Chem ZGD Manufacturers: Haagen Chemie b.V., P.O. Box 14, 6040 AA Roermond/Holland) were dissolved in
1.80 parts by weight of bis-(3-dimethylaminopropyl)amine and combined with
74.98 parts by weight of a polyether with an OH number of 28 obtained by the addition of propylene oxide followed by the addition of ethylene oxide to trimethylolpropane (ratio by weight PO:EO=83:17),
20.70 parts by weight of a mixture of 65 parts by weight of 1-methyl-3,5-diethyl-phenylenediamine(2,4) and 35 parts of 1-methyl-3,5-diethylphenylenediamine-(2,6),
0.18 parts by weight of dimethyl tin dilaurate and
0.54 parts by weight of 1,4-diazabicyclo-(2,2,2)octane in the form of a 33% solution (Dabco 33 LV, Air Products)
to form a polyol component which was worked up with 56.3 parts by weight of a reaction product of tripropylene glycol and 4,4'-diphenylmethane diisocyanate (23% by weight NCO) by the RIM process.

The experimental series was stopped when 50 articles had been removed from the mold. The tearing force required for the last emptying of the mold was found to be 7.7 kN (see Table).

The polyol formulation was left in the RIM installation and tested again after 3 days. The molded products could easily be removed from the mold. The tearing force measured for the last emptying of the mold was 7.7 kN. The polyol formulation at that stage was clear with virtually no perceptible cloudiness due to precipitated zinc stearate.

EXAMPLE 2 (Comparison)

1.80 parts by weight of zinc stearate of the type used in Example 1 were dissolved in
1.80 parts by weight of an amine-started poly(oxyalkylene) polyether tetrol having an OH number of about 630 and obtained by the addition of about 5 mol of propylene oxide to 1 mol of ethylene diamine, and the solution was combined with
74.98 parts by weight of a polyether with OH number 28 obtained by the addition of propylene oxide followed by the addition of ethylene oxide to trimethylolpropane (ratio by weight PO:EO=83:17),
20.70 parts by weight of a mixture of 65 parts by weight of 1-methyl-3,5-diethyl-phenylenediamine(2,4) and 35 parts of 1-methyl-3,5-diethylphenylenediamine-(2,6),
0.18 parts by weight of dimethyl tin dilaurate and
0.54 parts by weight of 1,4-diazabicyclo-(2,2,2)octane in the form of a 33% solution (Dabco 33 LV, Air Products)
to form a clear polyol component which was then worked up with 58.4 parts by weight of a reaction product of tripropylene glycol and 4,4'-diphenylmethane diisocyanate (23% by weight NCO) by the RIM process.

The experimental series was stopped after the mold had been emptied 50 times. The tearing force for the last emptying of the mold was found to be 11.9 kN (see Table).

The polyol formulation was left in the RIM installation and tested again after 1 day. The tearopen forces increased considerably and were found to be 14.4 kN at the final emptying of the mold. The polyol formulation had become cloudy due to precipitated zinc stearate.

EXAMPLE 3 (Comparison)

1.80 parts by weight of zinc stearate of the type used in Example 1 were dissolved in
1.80 parts by weight of a bifunctional polyether terminated with primary amino groups and having a molecular weight of approximately 400 (Texaco's Jeffamine D 400 available from Texaco) and the solution obtained was combined with
74.98 parts by weight of a polyether with OH number 28 obtained by the addition of propylene oxide followed by the addition of ethylene oxide to trimethylolpropane (ratio by weight PO:EO=83:17),
20.70 parts by weight of a mixture of 65 parts by weight of 1-methyl-3,5-diethyl-phenylenediamine(2,4) and 35 parts of 1-methyl-3,5-diethylphenylenediamine-(2,6),
0.18 parts by weight of dimethyl tin dilaurate and
0.54 parts by weight of 1,4-diazabicyclo-(2,2,2)octane in the form of a 33% solution (Dabco 33
to form a clear polyol component which was worked up with 56.2 parts by weight of a reaction product of tripropylene glycol and 4,4'-diphenylmethane diisocyanate (23% by weight NCO) by the RIM process.

The experimental series was stopped after the mold had been emptied 26 times. The force required for tearing open the mold for the last emptying of the mold was found to be 13.2 kN. No further molded parts could be removed from the mold.

TABLE

| Example | Testing | Opening Force (kN) 10th | 25th | 50th | Appearance of polyol formulation |
|---|---|---|---|---|---|
| | | molded part | | | |
| 1 | immediate | 7.1 | 7.3 | 7.7 | clear |
| | after 3 days | 6.9 | 7.2 | 7.7 | clear |
| | after 3 weeks | 6.3 | 8.0 | 10.9 | clear |
| 2 | immediate | 5.6 | 8.0 | 11.0 | clear |
| | after 1 day | 6.1 | 9.2 | 14.4 | cloudy, sediment |
| 3 | immediate | 8.1 | 12.8 | — | clear |
| | after 1 day | — | — | — | cloudy, sediment |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mold release composition comprising a solution which is liquid at room temperature of
   (i) about 10 to 75%, based on the weight of the composition of at least one zinc salt of a straight or branched chain, saturated or unsaturated aliphatic carboxylic acid having 8 to 24 carbon atoms in
   (ii) at least one organic compound containing tertiary nitrogen atoms which is liquid at room temperature and comprises at least one compound corresponding to the formula

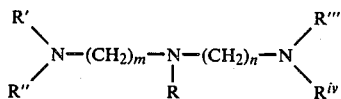

wherein

R', R", R'" and R$^{iv}$ may be identical or different and represent alkyl groups with 1 to 4 carbon atoms or two of the groups, R' and R" or R'" and R$^{iv}$, may combine with the nitrogen atom to form a 6-membered heterocyclic ring optionally containing an oxygen atom or an alkyl-substituted nitrogen atom as heteroatoms and having a total of 4 or 5 carbon atoms, R denotes hydrogen or a group corresponding to the formula

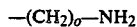

and m, n and o stand for identical or different integers having values from 2 to 6.

2. The mold release composition of claim 1 wherein component (i) comprises zinc stearate and component (ii) comprises a compound corresponding to the formula set forth in claim 1 wherein R', R", R'" and R$^{iv}$ are each methyl groups, R is hydrogen and m and n are identical and have the value 2 or 3.

3. The mold release composition of claim 2 wherein component (ii) additionally comprises an amine-initiated polyether polyol.

4. A mixture suitable as a reactant for an organic polyisocyanate which comprises (a) at least one organic compound having a molecular weight of 400 to about 12,000 and containing at least two isocyanate-reactive groups, (b) about 5 to 50% by weight, based on the weight of component (a), of at least one organic compound having a molecular weight of 62 to 399 and containing two isocyanate-reactive groups and (c) a mold release composition comprising a solution which is liquid at room temperature of (i) about 10 to 75%, based on the weight of component (c), of at least one zinc salt of a straight or branched chain, saturated or unsaturated aliphatic carboxylic acid having 8 to 24 carbon atoms in (ii) at least one organic compound containing tertiary nitrogen atoms which is liquid at room temperature and comprises at least one compound corresponding to the formula

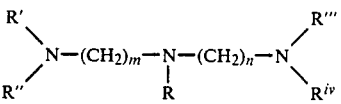

wherein

R', R", R'" and R$^{iv}$ may be identical or different and represent alkyl groups with 1 to 4 carbon atoms or two of the groups, R' and R" or R'" and R$^{iv}$, may combine with the nitrogen atom to form a 6-membered heterocyclic ring optionally containing an oxygen atom or an alkyl-substituted nitrogen atom as heteroatoms and having a total of 4 or 5 carbon atoms, R denotes hydrogen or a group corresponding to the formula

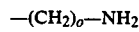

and m, n and o stand for identical or different integers having values from 2 to 6, said mixture containing about 0.5 to 10 parts by weight of said zinc salt per 100 parts of component (a).

5. The mixture of claim 4 wherein component (a) comprises at least one polyether having a molecular weight of about 1800 to 12,000 and a total of 2 or 3 isocyanate-reactive groups comprising a member selected from the group consisting of primary alcoholic hydroxyl groups, secondary alcoholic hydroxyl groups and primary amino groups, component b) comprises 1-methyl-3,5-diethyl-2,4-diaminobenzene with up to 35% by weight of 1-methyl-3,5-diethyl-2,6-diaminobenzene, component (c)(i) comprises zinc stearate and component (c)(ii) comprises a compound according to the formula set forth in claim 4 wherein R', R", R'" and R$^{iv}$ are each methyl groups, R is hydrogen and m and n are identical and have the value of 2 or 3.

6. The mixture of claim 5 wherein component (c)(ii) additionally comprises an amine-initiated polyether polyol.

7. A process for the production of elastomeric molded articles of polyurethane or polyurea elastomers having a compact surface layer which comprises reacting inside closed molds a reaction mixture which comprises (A) a polyisocyanate component comprising at least one di- or polyisocyanate in which all of the isocyanate groups are aromatically bound and (B) the mixture of claim 4.

8. The process of claim 7, wherein component (A) comprises a polyisocyanate or polyisocyanate mixture of the diphenylmethane series which is liquid at room temperature and optionally contains urethane, carbodiimide and/or uretoneimine groups.

9. The process of claim 7 wherein component (B) additionally comprises an amine-initiated polyether polyol.

10. A molded article obtained in accordance with claim 7.

11. A molded article obtained in accordance with claim 6.

12. A molded article obtained in accordance with claim 9.

* * * * *